Jan. 13, 1948.                P. F. RIORDAN                2,434,587
              SLAUGHTERING TOOL FOR DRY PICKING POULTRY
                         Filed Jan. 7, 1946
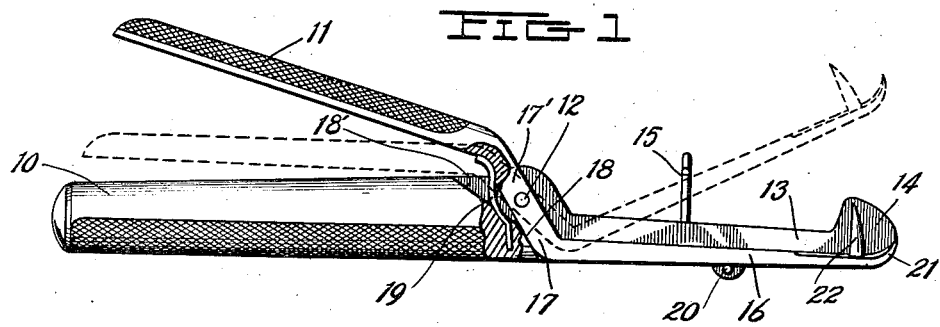
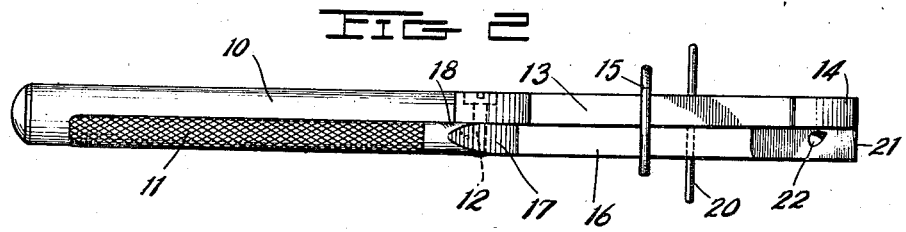
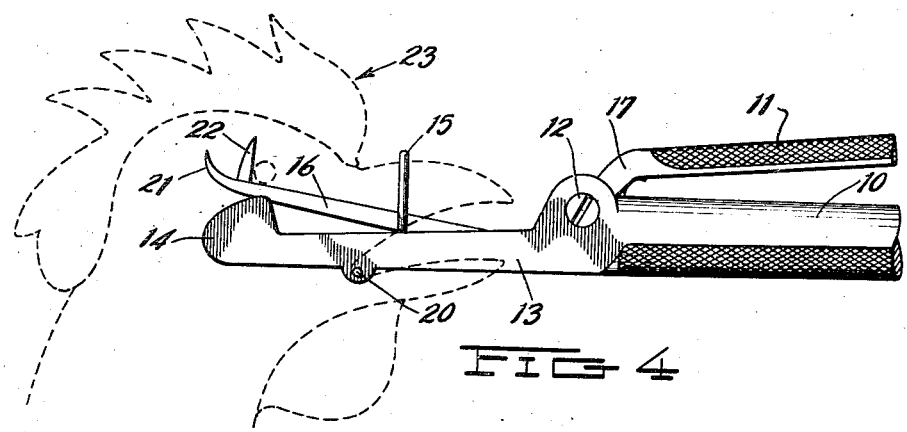
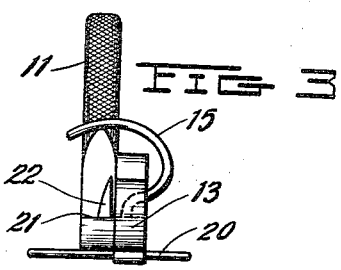
Inventor
Patrick F. Riordan
By Clarence A. O'Brien
and Harvey B. Jacobson
                    Attorneys

UNITED STATES PATENT OFFICE 2,434,587

SLAUGHTERING TOOL FOR DRY PICKING POULTRY

Patrick F. Riordan, Summit Hill, Pa.; Margaret Balliet, administratrix of said Patrick F. Riordan, deceased, assignor to F. S. Riordan, Lansford, Pa.

Application January 7, 1946, Serial No. 639,597

6 Claims. (Cl. 17—11)

This invention relates to a tool for killing poultry of any description and size not only efficiently and quickly but humanely with ease causing the bird no pain and avoiding all mess generally inherent with such a process, so that the fowl can be delivered clean and in good shape to the market.

One of the main objects of the invention is to keep the feathers of the bird clean, dry and unstained by blood resulting from the killing. Since only a little blood will trickle from the bird's mouth after the use of this tool, a moderate amount of care is needed to prevent blood from spreading all over the body. Hence, the title of this invention.

This tool is particularly useful for farmers having very large flocks of chicken, turkeys or other poultry, saving a great deal of trouble and work, a trained man being able to dispatch as many as 100 fowls per hour.

My tool is of very simple construction, operating like a pair of pliers and made from easily obtainable material. It can be manufactured at low cost and sold on the market very cheaply in hardware and ten-cent stores and the like.

These and other advantages will be understood from reading the following description with the aid of the accompanying drawing showing one embodiment of my invention.

Figure 1 is a side elevation of the poultry tool, shown in position for insertion into the bird's mouth.

Figure 2 is a top plan view of Figure 1.

Figure 3 is a front elevation of the tool as seen from the right of Figure 1.

Figure 4 is a side elevation of the tool as inserted in the bird's mouth and with the parts of the tool moved into positions for killing the bird.

In the drawings, like reference characters denote the same details in the different views. Like pincers or pliers this tool consists of two main parts, a handle 10 and an operating lever 11 joined together about midway of their length by a pivot pin 12. The handle 10 has a forwardly extending jaw 13 forming practically a straight continuation of the handle proper and terminating with an upwardly projecting, well rounded bulged member 14 forming a guard, which is intended for contacting with the roof of the bird's mouth during operation and to hold the mouth open.

In order to have a firm hold on the bird's beak and coacting with the inserted bulge member 14, a hook member 15 of a proper size to fit over the upper mandible of a beak is secured on the jaw 13 between the said member 14 and the pivot pin 12. It is evident that the location of the hook 15 on the jaw needs to be adjusted according to the type and kind of the fowl treated and that its shape and length must be modified accordingly. For instance, a wider, flatter hook is needed for a duck bill than for that of a chicken.

The lever 11 has also a forwardly extending jaw 16 beyond the pivot pin 12. The central connecting portion 17 between the jaw portion 16 and the lever or handle 11 is offset to about against a shoulder 18 cut in the handle 10, to limit the downward swing of the jaw 16. In order to hold the jaw portions 13 and 16 normally in position for insertion, a spring 19 of flat steel is terminally secured in a recess in the handle 10 centrally of the shoulder 18 and contacting the lever 11 to hold the jaws in the relative position as in Figure 1, ready for insertion in the bird's mouth. When the lever 11 is moved into the position shown in dash line in Figure 1, the part 17' of the portion 17 abuts the part 18' of the shoulder 18, thus limiting the relative movement of the jaws 13 and 14.

A stop pin or "bit" 20 is shown secured in a hole through the jaw 13 for limiting the extent of insertion when it strikes against the angle of the mouth. This stop pin is long enough to hit on both sides of the mouth. The jaw portion 16 terminates with an upwardly bent transverse knife edge 21 and has, slightly to the rear thereof, a spike or sharp point 22.

The operation of the tool is the following with special reference to Figure 4.

The outline of a chicken's head 23 is shown with its mouth open. This permits the insertion of the tool with the jaw portions 13, 16 shut as in Figure 1 until the step pin 20 or "bit" strikes angles of the mouth on both sides and the bulge member 14 reaches the roof of the mouth, back of the eye, while the lower parts of the jaws 16 rest on the tongue. Simultaneously the hook 15 is slid over the beak of the bird, thereby holding it firmly and preventing any movement of its head.

By pressing handle 10 and lever 11 together against action of the spring 19, the knife edge 21 will rise to cut the blood vessels in the roof of the mouth while the spike or sharp point 22 pierces the chicken's brain.

The applicant being a poultry man of long standing and considerable experience has found that the sticking of the bird in the brain by means of the sharp point 22, as just described, will cause its feathers to loosen and facilitate dry picking; and since all the bleeding will thus occur from the bird's mouth the feathers will remain clean, dry and are unstained, both these facts are of considerable importance for a successful poultry business.

It is to be understood that the invention as here disclosed is not limited to the details here described and shown but that the same may be varied without departing from the spirit of the invention as defined by the subjoined claims.

I claim:

1. A tool for humanely and cleanly slaughtering poultry of any kind, comprising a pair of jaw members pivoted together about midway of their length, the rear portions of which are operating handles, means for keeping the jaw members normally closed and abutment means limiting the opening thereof, means on one of said jaw members for limiting the extent of insertion of the tool in the mouth of a bird and firmly holding its head from moving and other means for piercing and cutting the roof of the mouth at the end of the other jaw member.

2. A tool for humanely and cleanly slaughtering poultry of any kind, comprising a pair of jaw members pivoted together about midway of their length, the rear portions of which are operating handles, means for keeping the jaw members normally closed and abutment means limiting the opening thereof, means on one of said jaw members for limiting the extent of insertion of the tool in the mouth of a bird and firmly holding its head from moving and other means for piercing and cutting the roof of the mouth at the end of the other jaw member, said holding means consisting of an anchoring bulge member on the forward end of one of the jaw members for interior engagement and an upwardly directed hook for exterior engagement of the bird's head and said means for limiting the tool insertion consisting of a "bit" element on said one of the jaw members adapted for engaging in the mouth angles of the bird.

3. A tool for humanely and cleanly slaughtering poultry of any kind, comprising a pair of jaw members pivoted together about midway of their length, the rear portions of which are operating handles, means for keeping the jaw members normally closed and abutment means limiting the opening thereof, means on one of said jaw members for limiting the extent of insertion of the tool in the mouth of a bird and firmly holding its head from moving and other means for piercing and cutting the roof of the mouth at the end of the other jaw member, said cutting means consisting of a transversely directed knife-edge at the forward end of the other jaw member.

4. A tool for humanely and cleanly slaughtering poultry of any kind, comprising a pair of jaw members pivoted together about midway of their length, the rear portions of which are operating handles, means for keeping the jaw members normally closed and abutment means limiting the opening thereof, means on one of said jaw members for limiting the extent of insertion of the tool in the mouth of a bird and firmly holding its head from moving and other means for piercing and cutting the roof of the mouth at the end of the other jaw member, said cutting means consisting of a transversely directed knife-edge at the forward end of the other jaw member, and said piercing means consisting of a spike adjacent said knife edge.

5. A tool for humanely and cleanly slaughtering poultry of any kind, comprising a pair of jaw members pivoted together about midway of their length, the rear portions of which are operating handles, means for keeping the jaw members normally closed and abutment means limiting the opening thereof, means on one of said jaw members for limiting the extent of insertion of the tool in the mouth of a bird and firmly holding its head from moving and other means for piercing and cutting the roof of the mouth at the end of the other jaw member, said cutting means consisting of a transversely directed knife-edge at the forward end of the other jaw member, and said piercing means consisting of a spike adjacent said knife edge, said means for holding the head consisting of an anchoring bulge member on the forward end of one of said jaw members for interior engagement and an upwardly directed hook for exterior engagement of the bird's head, and said means for limiting the tool insertion consisting of a "bit" element on the other jaw member adapted for engagement in the mouth angles of the bird.

6. A tool for humanely slaughtering poultry of any kind and to facilitate dry picking thereof; comprising a pair of jaw members pivoted together about midway of their total length, the rear portions of which are operating handles, means for keeping the jaw members normally closed, abutment means limiting the opening thereof, and means on one of said jaw members for limiting the extent of insertion of the tool in the mouth of the bird and firmly holding its head from moving, one of said jaw members having a pointed spike for piercing the brain and a transverse knife for cutting the blood vessels in the mouth of the bird, whereby to facilitate dry picking of the bird.

PATRICK F. RIORDAN.

REFERENCES CITED

The following references are of record in the file of this patent:

UNITED STATES PATENTS

| Number | Name | Date |
| --- | --- | --- |
| 1,503,372 | Pacholke | July 29, 1924 |
| 1,580,790 | MacAllister | Apr. 13, 1926 |
| 2,081,229 | Fisher et al. | May 25, 1937 |